United States Patent [19]
Klement et al.

[11] Patent Number: 5,752,753
[45] Date of Patent: May 19, 1998

[54] WHEEL SLIP CONTROL SYSTEM FOR CONTROL OF PNEUMATIC BRAKE AND AN AUTOMATIC LIMITED-SLIP DIFFERENTIAL

[75] Inventors: Roland Klement, Haunshofen; Martin Mederer, Munich; Alfred Utzt, Fürstenfeldbruck, all of Germany

[73] Assignee: Knorr-Bremse Systeme Fur Nutzfahrzeuge GmbH, Munich, Germany

[21] Appl. No.: 669,439

[22] PCT Filed: Dec. 8, 1994

[86] PCT No.: PCT/DE94/01465

§ 371 Date: Jul. 2, 1996

§ 102(e) Date: Jul. 2, 1996

[87] PCT Pub. No.: WO95/19281

PCT Pub. Date: Jul. 20, 1995

[30] Foreign Application Priority Data

Jan. 13, 1994 [DE] Germany ............ 44 00 667.5
Mar. 21, 1994 [DE] Germany ............ 44 09 585.6

[51] Int. Cl.⁶ .................................................. B60K 28/16
[52] U.S. Cl. ..................... 303/190; 303/139; 180/197; 192/85
[58] Field of Search ...................... 393/190, 188, 393/DIG. 6, 118.1, 139; 180/197, 370

[56] References Cited

U.S. PATENT DOCUMENTS

| | | | |
|---|---|---|---|
| 4,700,797 | 10/1987 | Leiber | 180/198 |
| 4,753,131 | 6/1988 | Wupper | 74/710.5 |
| 5,105,903 | 4/1992 | Buschmann | 303/190 |
| 5,220,975 | 6/1993 | Zimmer et al. | 180/197 |
| 5,335,764 | 8/1994 | Leitner et al. | 192/85 |
| 5,431,241 | 7/1995 | May et al. | 180/197 |

*Primary Examiner*—Matthew C. Graham
*Attorney, Agent, or Firm*—Barnes & Thornburg

[57] ABSTRACT

A modified antilock system/wheel slip control system arrangement is provided whose logic provides the use of the wheel slip control system valve as the actuating valve for the compressed-air cylinder used for engaging the differential lock of a limited-slip differential. The wheel slip control system valve or actuating valve will become operative, when a wheel slip control system control operation is started or when a coefficient of adhesion difference is recognized between the right and the left driving wheel of the vehicle at a pressure below a pressure threshold which engages the differential lock, to carry out the conventional wheel slip control system brake control. Once a maximum speed is reached and the adhesion difference is minimized, the wheel slip control system valve is fully opened to engage the differential lock.

12 Claims, 3 Drawing Sheets

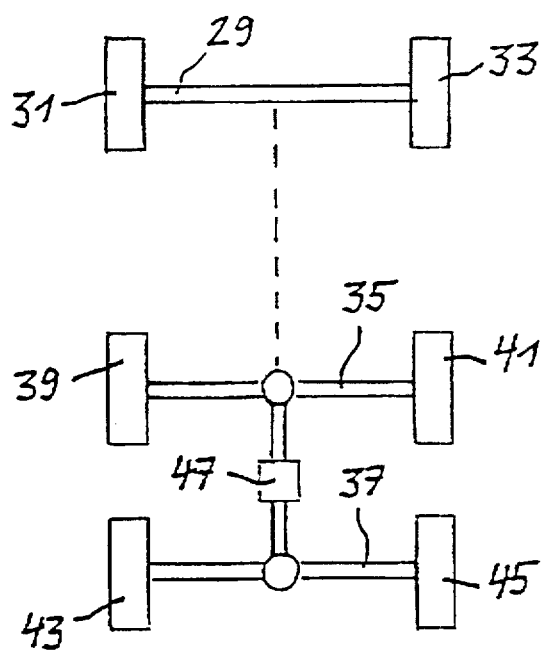

WHEEL SLIP CONTROL SYSTEM FOR CONTROL OF PNEUMATIC BRAKE AND AN AUTOMATIC LIMITED-SLIP DIFFERENTIAL

BACKGROUND AND SUMMARY OF THE INVENTION

The invention relates generally to a wheel slip control system (ASR-system) and more specifically to a wheel slip control system in combination with a pneumatically operated limited-slip differential lock.

For motor vehicles with connectible drives and/or for connectible locks for axle and central differentials, locking clutches are used in order to avoid the disadvantages of large friction clutches.

Based on this technological background, limited-slip differentials were developed with jaw clutches (European Patent Document EP-0510457 A1 corresponding to U.S. Pat. No. 5,335,764), in which the clutch jaws are shaped such that an engaging of the differential lock is also possible at differential rotational speeds of up to approximately 150 r.p.m without destroying the clutch jaws. The engaging of the differential lock takes place by a compressed-air cylinder which presses together the jaws of the clutch by a mechanical linkage until these jaws engage. When the jaws are engaged, no actuating force of the compressed-air cylinder is necessary since, because of the special shaping of the clutch jaws, these will not be released as long as a drive torque is transmitted by the engine of the vehicle. In the case of an actuation, the compressed-air cylinder is acted upon by compressed air via a simple electropneumatic 3/2-way valve.

In the case of commercial vehicles equipped with differential locks of the above-mentioned type, which vehicles are also used off-the-road, wheel slip control systems (ASR-systems) with a pneumatic brake control are increasingly used. In this case, as required, a brake control is activated at vehicle speeds below 40 km/h. Here, by opening the so-called wheel slip control valve of the wheel to be braked, stored pressure is provided; a pressure control valve arranged behind, the brake pressure on this drive wheel is then controlled such that an optimal differential brake effect is achieved.

The object of the present inventions consists of further developing vehicles equipped with antilock/wheel slip control systems, particularly commercial vehicles, which have automatic differential locks of the above-mentioned type, with respect to their electronic control systems in such a manner that, without significant additional expenditures, in addition to the automatic locking switching for the differential lock, the conventional antilock system/wheel slip control system brake control can also be carried out. As a result, it is to be achieved, among other things, that, when starting on a hill on µ-split roads (roads with different friction values of the road sides), the vehicle can also be accelerated when, because of excessive rotational speed differences, the lock is not yet engaged. Also, the "soft" starting on a µ-split road is to be permitted without the danger of stalling the engine.

The objects are achieved by modifying the antilock system/wheel slip control system while changing the logic of the antilock system/wheel slip control system control unit to use a pressure below a pressure level predetermined essentially by the spring restoring force of the limited-slip differential to operate the conventional brake control on the driving wheels of the vehicle. That is, the actuating valve of the compressed-air cylinder for the limited-slip differential acts as a normal wheel slip control valve when the control logic recognizes a coefficient of adhesion difference between the left and the right driving wheel and wants to modulate it. In this case, the logic is designed such that the brake control is maintained until preferably two conditions are met which are specified for engaging the differential lock. It is only then that the actuating or wheel-slip control valve is fully opened in order to engage the lock at the differential. As a result, stalling of the engine is reliably avoided. With respect to their stability, the jaws of the lock are also stressed far less because the rotational speeds of the driving wheels are synchronized before the lock is engaged.

Advantageous embodiments and further developments of the invention are indicated in additional claims.

BRIEF DESCRIPTION OF THE DRAWINGS

FIG. 3 is a schematic representation of the arrangement according to the invention on a commercial vehicle with two driven rear axles.

DETAILED DESCRIPTION OF THE PREFERRED EMBODIMENTS

Figure 1:
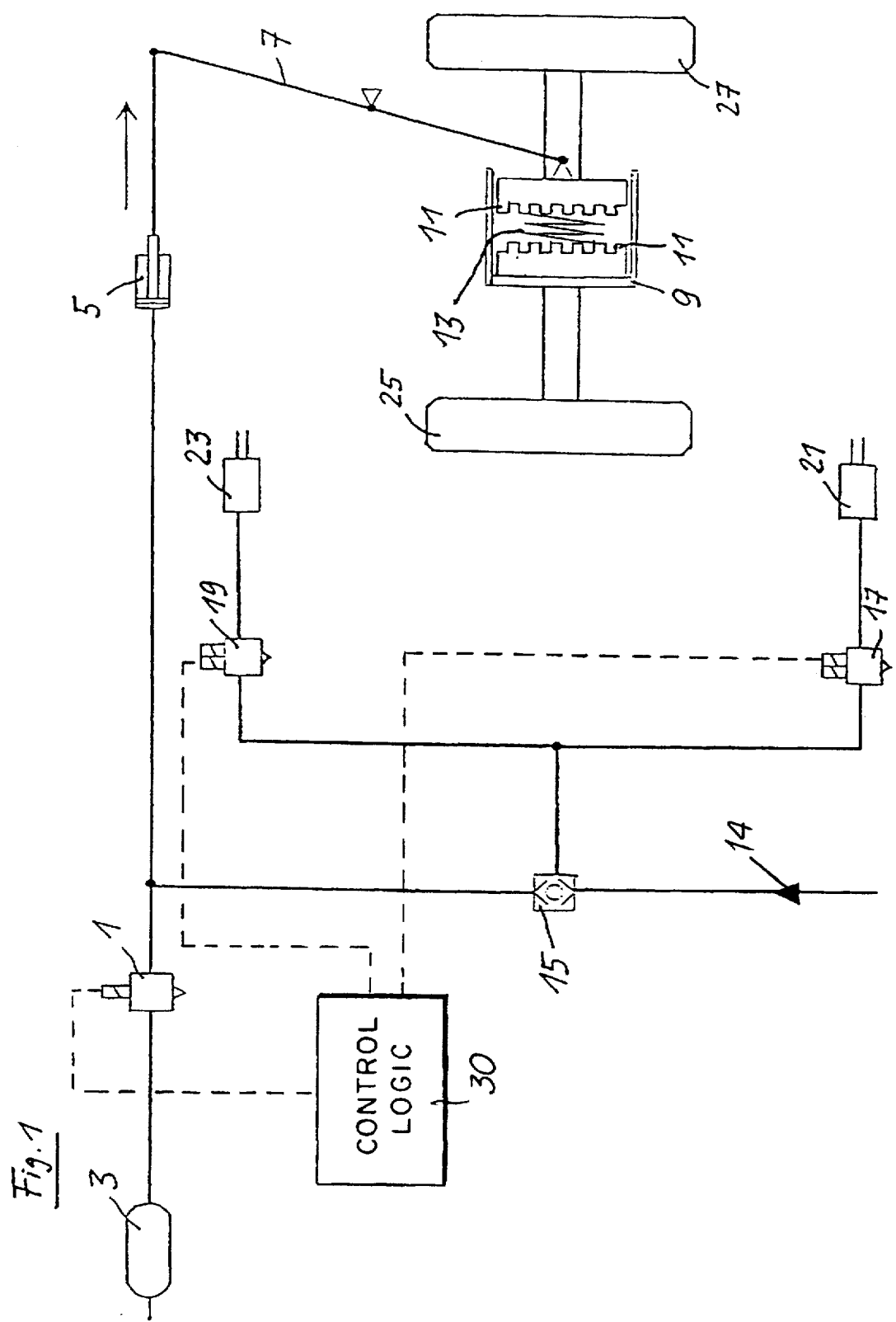
FIG. 1 is a diagram of the wheel slip control system with a pneumatic brake control and an automatic limited-slip differential according to the present invention.

In the case of the system schematically illustrated in FIG. 1, a wheel slip control valve 1 is provided which is connected to a storage device 3 carrying compressed air. The wheel slip control valve 1 is also connected to a compressed-air cylinder 5 and acts with respect to it in the manner described in the following according to the invention as an actuating valve. By a linkage 7, the compressed-air cylinder 5 actuates a limited slip differential 9 or its clutch jaws 11 which can be mutually engaged against the force of a spring 13 in order to engage the lock. In the case of a limited-slip differential of the initially mentioned type, when the clutch jaws are engaged, no actuating force of the compressed-cylinder 5 will be necessary because, as a result of the special shaping of the clutch jaws, these cannot be released as long a driving torque is transmitted by the engine of the vehicle. In addition, a select-high valve 15 (change-over valve or two-way valve) is connected to the wheel slip control valve 1 and to the antilock system pressure control valves 17 and 19 for brake cylinders 21 and 23 of the driving wheels 25 and 27 of the vehicle. Control logic 30 operates valves 1, 7 and 19.

From the conventional service brake system (BBA) of the vehicle, another connection 14 leads to the select-high valve 15. In the case of an inactive slip control regulating operation or an inactive operation of the lock, a conventional brake operation of the brake cylinders 21 and 23 for the driving wheels is made possible.

A wheel slip control operation of the schematically illustrated system in connection with the lock actuation takes place as follows:

After the start of the wheel slip control operation, the whole braking and locking system remains inactive until the control logic 30 recognizes and wants to modulate a difference in the coefficient of adhesion between the left and the right driving wheel. From this moment, the wheel slip control system valve 1 is operated in a timed manner such that, on the average, a pressure is modulated which is below the threshold for engaging the lock; that is, for engaging the clutch jaws 11 of the limited-slip differential. The antilock system pressure control valve 17, 19 of the unbraked wheel is switched to "hold". By the pressure control valve 17, 19 of the braked driving wheel, the brake control is carried out normally. By this brake control, the driving torque can now "support" itself, whereby a driving force can be transmitted by the driving wheel with the good coefficient of adhesion (the unbraked wheel). The brake control will be maintained until the following two conditions are met simultaneously.

1. The vehicle moves at a certain minimum speed, for example, at 5 km/h;
2. Both driving wheels rotate approximately at the same speed.

When these conditions are met, the wheel slip control system valve 1 is controlled to fully open, as the actuating valve for the compressed-air cylinder 5, in order to engage the lock. At the same time, both antilock system pressure control valves 17, 19 of the driving axle are set to "bleeding" for slow reduction of brake pressure. This condition will be maintained until it is ensured that the clutch jaws 11 of the lock 9 are engaged. In the case of limited-slip differentials of the above-mentioned kind, it was found that a period of 2 seconds is definitely sufficient. After the expiration of this time period, the actuating or wheel slip control system valve 1 is deenergized again and the antilock system pressure control valves 17, 19 are set to "ventilating" fast reduction of brake pressure. This releases the brakes 21, 23. The lock will now automatically remain engaged until no more engine torque is applied. When this is the case, the lock will automatically be opened up again by the force of the spring 13.

If the above-mentioned conditions are not observed, the described system, in the case of a faster start-up on μ-split roads, would be subjected to problems because the differential rotational speeds of the driving wheels may become high so fast that an engaging of the lock for mechanical reasons would no longer be possible. According to the invention, the wheel slip control system, as explained above, can carry out a pure "select-low" control until, by the reduction of the driving torque, an extensive adaptation of the rotational speeds of the driving axle is carried out and an engaging of the lock is permitted.

By means of the control according to the invention with the inclusion of the conditions, the problem of starting-up on a hill is also solved.

If the above-mentioned "select-low" phase were to occur during a start-up on a hill, the vehicle would at first roll back. Since the electronic antilock system cannot differentiate between forward and reverse driving, in this case, the lock would be engaged in the case of an unacceptably high rotational speed because the negative speed of the wheel on the high coefficient of adhesion would be assessed by the electronic system as a positive speed. When the conditions for the brake control are taken into account, this problem will be solved.

A problem of the pure "select-low" control may also occur in the case of a "soft" start-up on a μ-split road. Thus, on a road with unequal coefficients of adhesion, since the lock may under certain circumstances be engaged too early, there would be the risk of stalling the engine. The reason is that, by the engagement of the lock, the rotational speed of the wheel running on the lower coefficient of adhesion would necessarily be adapted to the wheel which is at the good coefficient of adhesion and is almost still standing. However, it is a prerequisite of the control according to the invention that the vehicle moves at a certain minimum speed. This therefore excludes the problem of stalling the engine.

The explained problems during the existence of an excessive differential rotational speed, during a start-up on a hill and during a "soft" start-up on a μ-split road are avoided by the adaptation according to the invention of the antilock system/wheel slip control system logic while taking into account predetermined conditions because the effect is utilized that the wheel slip control system valve 1 which admits compressed air to the compressed-air cylinder 5 can be operated below a pressure threshold in a timed manner such that, in addition, the conventional brake control can be carried out.

By the invention it was made possible that, without significant additional expenditures, in addition to the automatic lock switching, the conventional wheel slip control system brake control can also be carried out. This therefore provides a universal brake and lock control. An additional advantage of the system illustrated is that, when the clutch jaws are engaged and the antilock system/wheel slip control system is simultaneously deactivated, the service brake system via the select-high valve 15 is permitted using the same components; that is, using the pressure control valves 17 and 19.

Within the scope of the idea of the invention, the wheel slip control system valve can also be operated such that at least two pressure levels can be adjusted in a more or less stationary manner; this may, for example, be a proportional-action valve.

Figure 2:
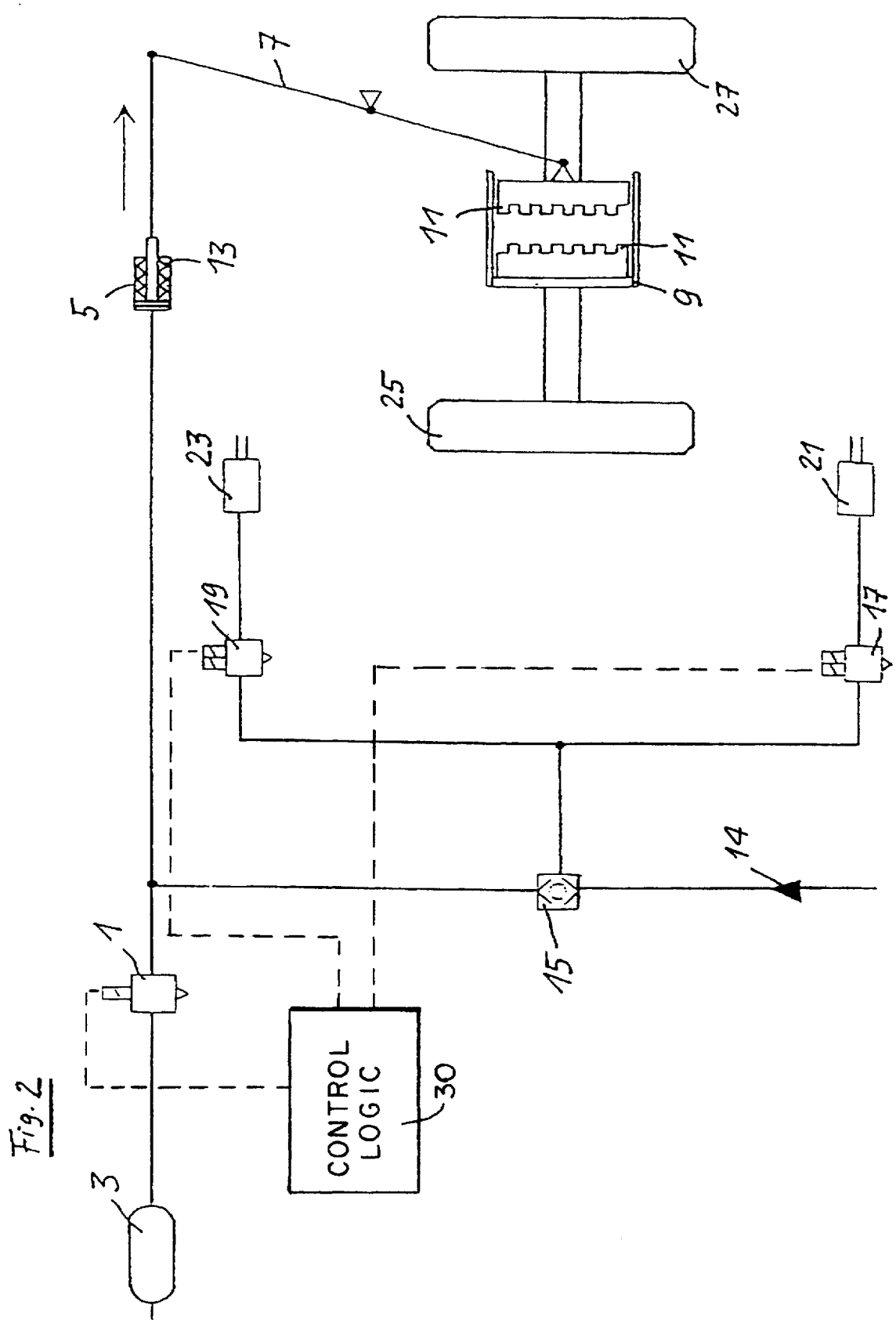
FIG. 2 is a view which is comparable to FIG. 1 of the arrangement according to the invention with a different position of the spring acting against the actuating force of the limited slip differential.

FIG. 1 shows the spring 13 as being situated in the limited-slip differential 9. Naturally, the spring 13 may also be directly assigned to the compressed-air cylinder 5 (FIG. 2) or may be provided at another position of the operation.

FIG. 3 of the drawing schematically illustrates the use of the principle according to the invention on a commercial vehicle with two rear axle drive shafts. The commercial vehicle has a nonpowered front axle 29 with the front wheels 31 and 33 and two rear axles with rear axle drive shafts 35 and 37. Driven rear wheels 39, 41 and 43, 45 are assigned to the two rear axle drive shafts. According to the invention, a longitudinal lock 47, which can be compared to the limited-slip differential 9, is connected between the rear axle drive shafts 35 and 37. Also in the case of this embodiment, it is possible to affect the rear wheels 39 to 45 by a wheel slip control system of the known type below a pressure threshold. Whereas, when the minimum pressure is exceeded and predetermined conditions are met, an operating of the longitudinal lock 47 takes place in the sense of the synchronization of the rear axle drive shafts. Accordingly, the sum of the individual speeds of the rear wheels 39, 42 of one rear axle is equal to the sum of the speeds of the rear wheels 39, 45 of the other rear axle.

Although the present invention has been described and illustrated in detail, it is to be clearly understood that the same is by way of illustration and example only, and is not to be taken by way of limitation. The spirit and scope of the present invention are to be limited only by the terms of the appended claims.

We claim:

1. Wheel slip control system with a pneumatic brake control for vehicles which are equipped with an automatic limited-slip differential, the limited-slip differential includes a compressed-air cylinder for engaging clutch jaws of the differential when actuated, the control system comprising:

a) a wheel slip control system valve for actuating the wheel slip control system and, at the same time, actuating the compressed-air cylinder used for engaging the clutch jaws of the limited-slip differential; and b) the wheel slip control system being operable at a pressure below a minimum pressure of the compressed-air cylinder required for engaging the clutch jaws.

2. Wheel slip control system according to claim 1, wherein the wheel slip control system valve is operated in a timed manner such that, on the average, a pressure can be modulated which is below the minimum pressure for engaging the clutch jaws.

3. Wheel slip control system according to claim 1 wherein the wheel slip control system valve is fully opened for engaging the clutch jaws if at least two predetermined conditions are met.

4. Wheel slip control system according to claim 1, wherein the limited-slip differential is a longitudinal lock between two rear axle drive shafts.

5. Process for engaging the differential lock of a vehicle having a wheel slip control system a) when an adhesion value difference between left and right driving wheel is recognized, the wheel slip control system valve, for the purpose of the wheel slip control system brake control is operated such in a timed manner that, on the average, a pressure is modulated which is below the threshold for engaging the differential lock, and b) for the purpose of engaging the differential lock, the wheel slip control system valve is fully opened when two preset operating conditions are met.

6. Process according to claim 5, characterized in that the following operating conditions are predetermined.

a) the vehicle moves at a certain minimum speed, and b) both driving wheels of the vehicle rotate approximately equal speed.

7. Process according to claim 5 the fully operated condition is maintained until it is ensured that the lock is engaged.

8. Process according to claim 7 wherein, in the case of a fully rendered condition, both antilock system pressure control valves of an antilock system are simultaneously set to "bleeding".

9. Process according to claim 8 wherein after the expiration of the time required for engaging the differential lock, the wheel slip control system valve is deenergized while the antilock system pressure control valves are set to "ventilating".

10. Process according to claim 5, wherein, in the case of a fully opened condition, both antilock system pressure control valves of an antilock system are simultaneously set to "bleeding".

11. Process according to claim 10, wherein after the expiration of the time required for engaging the differential lock, the wheel slip control system valve is deenergized while the antilock system pressure control valves are set to "ventilating".

12. Wheel slip control system according to claim 3, wherein said condition includes minimum vehicle speed and driving wheels of the vehicle rotating at approximately equal speed.

* * * * *